United States Patent
Hollitt et al.

(10) Patent No.: US 8,388,728 B2
(45) Date of Patent: Mar. 5, 2013

(54) LEACHING ORES

(75) Inventors: Michael John Hollitt, Melbourne (AU);
Raymond Walter Shaw, Princes Hill
(AU); Kevin Lee Rees, Balwyn (AU)

(73) Assignee: Technological Resources Pty. Limited,
Melbourne (AU)

( * ) Notice: Subject to any disclaimer, the term of this patent is extended or adjusted under 35 U.S.C. 154(b) by 165 days.

(21) Appl. No.: 12/666,726

(22) PCT Filed: Jun. 26, 2008

(86) PCT No.: PCT/AU2008/000928
§ 371 (c)(1),
(2), (4) Date: Nov. 19, 2010

(87) PCT Pub. No.: WO2009/000037
PCT Pub. Date: Dec. 31, 2008

(65) Prior Publication Data
US 2011/0113928 A1    May 19, 2011

(30) Foreign Application Priority Data
Jun. 28, 2007   (AU) .............................. 2007903479

(51) Int. Cl.
C22B 3/06 (2006.01)
C22B 15/00 (2006.01)
(52) U.S. Cl. ............ 75/712; 75/743; 423/41; 423/150.1
(58) Field of Classification Search .................... 75/712, 75/743; 423/150.1, 41
See application file for complete search history.

(56) References Cited

U.S. PATENT DOCUMENTS

| 4,115,221 | A | 9/1978 | Wadsworth et al. |
| 4,256,553 | A | 3/1981 | Baczek et al. |
| 6,277,341 | B1 | 8/2001 | Pinches et al. |
| 6,319,389 | B1 | 11/2001 | Fountain et al. |
| 2003/0230171 | A1 * | 12/2003 | Imamura et al. ................ 75/743 |
| 2005/0044990 | A1 | 3/2005 | Shaw et al. |
| 2005/0269208 | A1 | 12/2005 | Dixon et al. |

OTHER PUBLICATIONS

International Search Report from the Australian Patent Office for International Application No. PCT/AU2008/000928, mailed Sep. 4, 2008.

* cited by examiner

*Primary Examiner* — George Wyszomierski
*Assistant Examiner* — Tima M McGuthry Banks
(74) *Attorney, Agent, or Firm* — Finnegan, Henderson, Farabow, Garrett & Dunner, LLP

(57) ABSTRACT

A process for leaching an ore containing sulfidic copper-containing minerals includes carrying out an aerated oxidizing leach of a part of the ore and producing an acidic leach liquor containing ferrous ions, ferric ions, and copper ions in solution. The process also includes carrying out a leach of another part of the ore using the leach liquor under conditions that minimize reactions with a source of iron in the ore and producing a leach liquor containing copper ions in solution. The process further includes recovering copper from the leach liquor.

35 Claims, 8 Drawing Sheets

Results of Test in Example 2

Results of Test in Example 5

LEACHING ORES

CROSS REFERENCE TO RELATED APPLICATION

This application is a national phase application based on PCT/AU2008/000928, filed Jun. 26, 2008, which claims the priority of Australian Patent Application No. 2007903479, filed Jun. 28, 2007, the content of both of which is incorporated herein by reference.

This invention relates to leaching sulphidic ores containing valuable metals.

This invention relates particularly, although by no means exclusively, to leaching sulphidic copper-containing ores.

This invention relates more particularly, although by no means exclusively, to leaching sulphidic copper-containing ores that include a source of iron, such as in the form of pyrite, as a part of the ores.

This invention relates more particularly, although by no means exclusively, to leaching sulphidic copper-containing ores that include large quantities of acid consuming gangue minerals, as a part of the ores.

This invention relates more particularly, although by no means exclusively, to leaching sulphidic copper-containing ores in high rainfall locations.

The term "high rainfall locations" is understood herein to mean locations having more than one metre per year of precipitation, especially where this precipitation is concentrated into a specific wet season.

This invention is based on a surprising discovery that it is possible to control leach conditions when leaching sulphidic copper-containing ores to achieve good leach rates for copper without consuming excessive reagents due to uncontrolled reactions of other minerals present, such as iron-containing minerals including pyrite or acid or sulphate consuming minerals such as amphibole, chlorite, biotite, muscovite, and phlogopite. Through doing this it is also possible to control the amount of iron, sulphuric acid, mineral acidity and neutral salts extracted into the leach liquor, hence avoiding or reducing the need to purchase otherwise needed quantities of acidifiers and/or avoiding or reducing the need to bleed large excesses of these products from the leach circuit for costly neutralisation. Surprisingly, it has also been found that both acid production from sulphide minerals, such as pyrite, and acid consumption by oxide gangue minerals can be reduced simultaneously.

This control of leach conditions is particularly important for, but not restricted to, ores where much of the copper is present as chalcopyrite and the ores also contain significant amounts of pyrite.

In conventional acid sulphate heap or dump leaching of copper sulphide containing minerals, with bacterially assisted oxidation, the broken but unmilled ore is stacked into heaps, aerated through direct injection of air and/or by natural convection, and irrigated with an acid sulphate lixiviant solution for extraction of copper into this solution that can subsequently be recovered by solvent extraction/electrowinning (SX/EW), cementation onto more active metals such as iron, hydrogen reduction or direct electrowinning.

Generally, heap and dump leaching (hereinafter referred to as "heap leaching") provides lower metal recoveries than the other dominant metallurgical process for copper ore processing, namely milling and flotation for recovery of copper into sulphide concentrates that are then smelted to produce copper metal in pyrometallurgical approaches. For this reason, heap leaching tends to be reserved for low grade ore types that have at least a proportion of readily recovered copper, but where milling costs per unit of copper are too high to support a concentrator approach, or where mineral liberation and other characteristics (e.g. arsenic content) will not support production of directly useable or saleable concentrates.

In many cases the ore that passes to heap leaching is a mineralised material that has been rejected by selection away from higher grade materials forming a mill feed.

For this reason, ores passing to heap leaching have a high ratio of other ("gangue") components to copper (perhaps 150 to 200:1). Some of these components are sulphidic and some are oxidic/siliceous/carbonate bearing.

There are two serious limitations on the application of heap leaching to practically and economically effective exploitation of copper bearing mineralisation:

(a) The normally more highly abundant primary copper mineral chalcopyrite generally provides very low recoveries, in part due to partial encapsulation in resistant gangue minerals, but mostly due to surface passivation reactions that occur under normal oxidative leach conditions that follow any leaching of secondary copper mineralisation that may be present.

(b) In many cases, the most common copper sulphide mineralisation occurrences known as copper porphyry deposits contain reactive gangue mineralisation that, when coupled with the low grades of copper that are reserved for heap leaching, requires high reagent consumption per unit of copper recovered for the purposes of maintaining an acid and sulphate balance that suits both leaching and solvent extraction. The resulting reagent costs have severe negative consequences for the economic feasibility of processing.

Reagent costs can be incurred for the purposes of delivering additional sulphate (by way of acid) to make up for sulphate that is precipitated from solutions by ore components, or for the purposes of consuming excess sulphate that is produced by oxidation of large quantities of sulphide minerals such as pyrite and pyrrhotite that may be present.

Those sulphide copper ore bodies that have been practically and economically processed by heap leaching have predominantly recovered copper from secondary mineralisation, and have had low reagent consumptions due to particular characteristics in the ore itself, such as gangue types that have the potential to consume only a little acid and deliver only a little sulphate into solution.

These constraints of copper mineralisation and gangue characteristics place significant limitations on the commercial exploitation of copper deposits that are too low in grade to be considered for processing to make concentrates, since for reasons of these limitations, only a small proportion of copper deposits that are discovered can be brought into probable and proven reserves for commercial exploitation.

Recent technology developments have done little to overcome these limitations on the now mature leaching and SX/EW approaches to resource exploitation. Indeed, all commercially adopted approaches that enable high copper recovery from leaching of chalcopyrite rely on first producing at least a crude copper sulphide concentrate by milling and flotation processes that are economically challenged for processing of low grade ores. That is, these processes, specifically the various high pressure and high temperature oxidation processes, and processes such as the Galvanox atmospheric pressure oxidation process and CESL chloride leach process suit a small niche of mineral resources that have an ore grade that supports a concentrator, but have mineralogical constraints that make it economically unattractive to produce concentrates for smelting or sale, and so have made little penetration into global copper production.

There is no commercially applied process that recovers a large proportion of available copper from chalcopyrite mineralisation in ore having a copper grade that is too low for application of milling and concentration but otherwise sufficiently high for heap leaching.

When heap leaching mixed ores that contain both chalcopyrite and secondary copper sulphide mineralisation it is found that recoveries from chalcopyrite are low, since secondary sulphide minerals are more reactive, consuming the necessary ferric iron intermediary in copper dissolution reactions preferentially until available secondary sulphide minerals have already largely reacted. The lower reactivity of primary copper sulphides such as chalcopyrite ensures that exit solutions under aerated conditions are well oxidised at least at some stage of copper recovery, with ferric to ferrous ratios that can exceed 100, and can be as high as 10,000. Under these conditions, and where ore units may be irrigated and aerated for times that exceed the times needed for high copper recovery rates, pyrite oxidation can be unavoidable, gangue reactions that can generate high loads of salts that must be neutralised are encouraged, and leaching of copper from particular copper minerals such as chalcopyrite can be slow enough that ultimate copper recoveries are lower than copper that is mineralogically available for leaching.

Prior art attempts to fill this gap by application of heap leaching to copper bearing ores are of two types:

(a) Processes that rely on application of thermophilic and extreme thermophilic bacteria that can assist the rapid oxidation of sulphides in coupled ore/solution systems that can occur at high temperatures.

(b) Processes that rely on control of conditions in mesophile and thermophile bacterially assisted heap leaching, avoiding chalcopyrite passivation by control of oxidant supply.

Processes of type (a) that rely on development of high temperatures in heap leaching depend on the ability to select bacteria sequentially during the heat up cycle of the ore, with sequential inoculation from cultured bacterial streams, requiring bacteria that are adapted to higher temperature conditions to effectively displace other bacteria that have been reproducing effectively up until the time of inoculation. There is great difficulty in developing bacterial strains that will dominate over other strains at one condition while still surviving at the conditions that will prevail at higher temperatures. It is especially difficult to develop an entire sequence of strains that will have this effect irrespective of changes in ore composition that occur under realistic industrial conditions.

In any case, application of this method of control does not overcome the fundamental limitations of acid balance on ore types that can be processed, because there is no independent control offered for pyrite and gangue reaction extents, especially at higher temperatures where pyrite and gangue reactions are each accelerated.

Processes of type (b) depend on sequential control of delivery of oxidant through reactions of air with the solution, with low delivery rates maintained as ore becomes more depleted in copper minerals so that solution oxidation potential remains below that at which chalcopyrite passivates. However, these processes depend on an ability to control air ingress to the heap to that which will just replenish oxidant into the solution to keep oxidation potential under control at the desired level. Given the size of heap leaching operations that provide very large areas for natural convection of air through top surfaces (even if heap flanks are covered) while enabling essentially anoxic conditions to prevail at other points unless there is forced aeration, the practical means of achieving these conditions must yet be identified and demonstrated.

The above description of the prior art is not to be taken as being an admission of the common general knowledge in Australia or elsewhere.

The present invention provides an industrially realistic method of operating heap leach for recovering copper and other metals from sulphide bearing ores, that enables operation with low reagent consumption across a broad range of ore types, including those having high pyrite or high reactive gangue contents, while providing for high recovery of copper from even chalcopyrite dominant ores.

The applicant has made a surprising discovery that it is possible to substantially leach copper from sulphidic copper-containing ores at high rates in an industrially realistic way by heap leaching (as understood herein to include dump leaching), including where copper is present as chalcopyrite, whilst restricting or enhancing the amount of pyrite (or other source of iron and sulphate) being attacked to match the acid and sulphate demands of gangue reactions, by practical control of process parameters such as, by way of example, the solution ferric to ferrous ratio, pH, temperature, and solution iron and salts content in contact with the ore.

More particularly, the applicants have discovered that the conditions that promote the transition of pyrite behaviour from virtually unreactive to reactive in heap leaching, providing the necessary capability to provide for an acid and sulphate balance when non sulphidic gangue components react, also coincide with the conditions necessary for recovery of copper from chalcopyrite and other primary mineralisation without passivation.

The applicant has also discovered the practical means of obtaining sufficient control that acid/sulphate balance and conditions for copper recovery can be maintained in very large heap leaching systems in which copper mineral, pyrite and non sulphidic gangue reactions can continue to occur sequentially for hundreds of days.

In particular, the applicant has discovered the practical means of controlling solution conditions in contact with sulphidic copper-containing ore in heap leaching so that pyrite reactions are largely, indeed almost entirely suspended while chalocopyrite reactions continue.

In one, although not the only aspect of this invention, solutions that are effective in maintaining pyrite in sulphide bearing ores unreactive in heap leaching may be characterised as having a ferric to ferrous ratio of less than 10, and preferably less than 5. In some cases it may be preferable to control ferric to ferrous ratio to be less than 1.

Where it is desired to maintain conditions under which pyrite is reactive, it is only then necessary to maintain conditions at higher than the relevant ferric to ferrous ratio, which can be achieved in heap leaching by aerating for a sufficient time that reduction of the solution by reaction with other sulphides is reduced by depletion, enabling normal aeration processes to generate the higher ratio. Copper recovery, including from chalcopyrite, can be achieved on either side of the pyrite transition condition, provided the condition under which pyrite is reactive is maintained within the conditions under which chalcopyrite does not passivate. Failing this, it is possible to limit the loss of recovery from chalcopyrite by limiting the proportion of reaction time for which it is passivated.

Controlling the ferric to ferrous ratio is one process option for the present invention to manage conditions and arrangements such that some ore fed to heap leaching is kept at least for a controllable part of its time in leaching under conditions that promote simultaneous pyrite reactions and copper recovery from chalcopyrite while this ore itself or other ore fed to heap leaching is kept at least for a controllable part of its time in leaching under conditions that promote copper recovery without substantial pyrite reaction, close to the optimum sulphate/acid balance can be achieved while also recovering a large proportion of the copper present.

Depending on the ore type that is fed to heap leaching, it is also possible to choose conditions in which both pyrite and some silicate gangue reactions are reduced, reducing the generation of sulphate salts so that neutralisation of bleed or side streams is unnecessary to maintain an acid/sulphate balance.

It is of particular value that ferric to ferrous ion ratios in feed liquor streams do not need to be less than 1 to maintain pyrite control under any circumstances, since ferric iron is the main oxidant for sulphide minerals in leach systems, so operable levels of ferric delivery can be maintained while still providing for the required degree of control.

In another, although not the only other, aspect of this invention it has been found that by controlling the iron content in solution for at least part of the leach cycle to be less than 5 gpL, preferably less than 4 gpL, and most preferably less than 3 gpL or by maintaining the solution pH at or above 1.8, it is possible to conduct leaching with a source of oxygen (such as air) without the need to control the ferric to ferrous ratio in the bulk solution, and obtain high selectivity of copper and other valuable metal extractions over pyrite reactions, while simultaneously reducing reactions involving gangue minerals that can result in high reagent consumption.

Thus, controlling iron content and pH in leach solutions is a second (but not the only other) process option for the present invention to manage conditions to achieve selective leaching of copper-containing ores.

In particular, it has been found that the process of the present invention makes it possible to leach sulphidic copper-containing ores that would normally not be suited to the commercial processes of heap and dump leaching, and remain undeveloped or rather would be considered to be more suited to production of concentrates for sale or production and leaching of sulphide concentrates, while obtaining the above benefits of high copper recovery and reduced deleterious or parasitic reactions.

In particular, it has also been found that the present invention makes it possible to leach sulphidic copper-containing ores if process conditions are maintained so that there is sufficient ferric iron in solution to practically deliver the required oxidant for leaching of copper sulphide minerals while ensuring that all or part of the pyrite present in the ores is kept essentially inert to oxidation, according to a desired degree of pyrite reaction.

With regard to the above discussion, in general terms, the present invention, in the context of copper-containing ores, provides a process for leaching a copper-containing ore that includes the steps of:

(a) carrying out an aerated oxidising leach of a part of the ore and causing reactions with a source of iron such as pyrite in the ore and producing an acidic leach liquor that contains ferrous ions, ferric ions, and copper ions in solution;

(b) carrying out a leach of another part of the ore using the leach liquor produced in step (a) under conditions that minimise reactions with a source of iron such as pyrite in the ore and producing a leach liquor containing copper ions in solution; and (c) recovering copper from the leach liquor.

Step (b) may use a controlled leach environment for the ore in which the amount of ferric iron present is restricted by engineering a system or systems whereby air ingress is controlled, or totally prevented, and the leach liquor flow and chemistry supplied to the leach step, for example in part from step (a), are managed such that the ferric to ferrous ratio in the liquor which reacts with the sulphidic copper-containing minerals present can also be controlled.

As is indicated above, the applicant has found that controlling conditions so that the leach liquor has a ferric to ferrous ratio of less than 10, and preferably less than 5, and in some cases less than 1, and generally in the range of 1.0 to 10 provides a leach environment in which the pyrite in the ore is effectively inert in heap leaching with little or no oxidation occurring due to the liquor, whilst the copper in the ore reacts to release the copper. Under these conditions, when processing copper-containing ores containing copper sulphide minerals, there is also little or no oxidation of the sulphides or sulphur present in the ore to sulphate. These conditions have the added advantage that they have been found to enhance the chalcopyrite reaction rate through being outside of the conditions where passivation commences to slow the reaction rate.

Alternatively to the above-described control of the ferric to ferrous ion ratio, the iron concentration and pH of the solution may be controlled to promote copper extraction while limiting pyrite extraction. In this aspect the rate at which ferric iron is formed in the coupled ore/solution system under aerated conditions is limited by management of the interaction between solutions and ore. It has been surprisingly found that the rate of ferric iron consumption and formation in this coupled system is related to the iron concentration and pH of the solution, so that at low iron levels in solution the ferric generation rate is low, and at higher pH the ferric generation at a particular iron level is also low.

This degree of control over ferric generation rate provides an ability to control the ferric to ferrous ratio in contact with sulphide surfaces so that copper extraction is promoted while pyrite oxidation to produce acid is impaired, by maintaining at least some of the pyrite in an inert or at least relatively unreactive state as copper is leached.

In one such arrangement for achieving enhanced selectivity of extraction of copper minerals over pyrite, the heap leach solution pH is maintained high (preferably above 1.6, more preferably above 1.8, most preferably about 2.0) for at least some of the time it is in contact with ore, with ferric iron in solution preferably less than 5 gpL, more preferably less than 4 gpL, and most preferably less than 3 gpL. Under these conditions it has been found that aerated heap or dump leaching of sulphide ores will most commonly provide enhanced selectivity of copper dissolution over pyrite oxidation, as preferential reactions between copper minerals and the limited ferric supply keep much of the pyrite below the solution threshold conditions for reaction. Pyrite reaction is deferred to higher copper recoveries, providing the benefit of high copper recoveries with control of pyrite reactions to maintain an acid/sulphate balance, reducing the need for reagent additions.

The leach liquor presented to the sulphide mineral surfaces in step (b) can be generated in a number of ways in step (a).

One (although not the only) option is to use a separate ore heap which is operated under aerated oxidising conditions to generate the leach liquor. This heap can be operated to provide copper recovery whilst some remains present and during this stage and beyond ultimately becomes a source of heat, ferric ions and sulphuric acid for the leach liquor that is then used in step (b).

An added advantage of this approach is that the pyrite in the aerated heap can be reacted such that the heap is then suitable for closure with reduced legacy issues due to continued reaction of the pyrite generating acid water which would need ongoing treatment. Distribution of ore and liquor between the separate ore heap and the ore in which chemistry is carefully controlled enables the desired balance of overall reactions to be obtained.

Preferred features of the process of this invention as described above include the following features separately or in combination.

1. The use of an aerated oxidising heap as step (a), to both extract copper and to provide a suitable leach liquor for a second leach environment which maximises the amount of copper extracted especially from more refractory copper minerals such as chalcopyrite.

2. The heap used in step (a) is fed at least in part with low copper bearing liquor, typically a raffinate from a solvent extraction step, and possibly with recycled copper bearing ferrous liquor, so that at least some of the iron present in the feed liquor is in the ferrous state. In this heap bacterial action is encouraged and oxygen is provided through either or both of natural ingress or forced injection of air or oxygen to promote the oxidation reactions. High iron in solution, which assists in supplying ferric iron to step (b) is also encouraged by maintaining a low pH and controlling inputs to this heap of elements that would aid precipitation of iron. Oxidation of ferrous iron and pyrite results in exothermic reactions that heat the liquor, supplying heat to step (b). In addition, temperature control to conditions that suit bacterial action while encouraging reaction of copper sulphides can be maintained according to the volume of air which is forced into the heap, generating evaporation that in high rainfall environments assists with reducing excess water that must be treated.

3. Within the aerated oxidising heap used in step (a) the dominant oxidation reactions are:

(a) oxidation of iron-containing minerals such as pyrite present to give ferric ions in solution, generate acid, and provide heat to the heap which further enhances the reactions;

(b) oxidation of ferrous ions in solution to ferric ions; and (c) oxidation of copper-containing sulphide minerals present to leach the copper into solution.

4. The conditions in the heap used in step (a), which is typically an above-ground leach, may optionally be deliberately varied with time such that initially the chemical conditions are set to maximise copper extraction but as this becomes depleted they are changed, through increasing the ferric to ferrous ratio, to maximise the rate of pyrite reaction and the amount of ferric ion generated. The heap may continue to generate ferric and acid after copper reactions are largely complete. The heap may be designed to control air ingress during the initial copper leaching phase and then be modified to drive high air flows when subsequently used to provide the more oxidised leach liquor.

5. The use of the solution generated in the aerated oxidising heap of step (a) as a leach liquor to leach copper from other copper-containing ores in step (b), with or without removal of copper from the solution prior to use, where those ores are present in an environment where one or more than one of the ferric to ferrous ratio, pH, and iron concentration can be controlled such that copper can be leached at an acceptable rate in step (b) without unwanted concurrent leaching of minerals such as pyrite which consume the oxidant present and can also cause issues with generation into solution of sulphuric acid that either reacts with gangue to produce salts that must be neutralised or will need to be neutralised to avoid interference of acid and sulphate with solvent extraction or other metal recovery processes.

6. One arrangement is where those ores to be leached in step (b) are present underground where sufficient mining and fragmentation has been carried out to enable leach liquor from step (a) to be fed to the ores and to contact the copper bearing sulphide minerals. In this case there is also a substantial advantage in the delivery of ferric iron, acid and heat from the oxidising heap of step (a) since distribution of sufficient air underground to support reaction of sulphide ores as otherwise needed has proven to be a significant deterrent to leaching of sulphide minerals in this environment. Further, by avoiding the need to aerate the ore higher irrigation rates per unit area can be obtained, since air and liquor are not competing for flow through the available pore and void space. This provides advantages in underground geometry, by enabling taller columns of ore without ferric breakthrough, and therefore reduced costs in multilevel access. Further, the oxidising heap of step (a) can be generated from ore that has been removed from underground to produce the necessary swell factor for fragmentation in blasting. Means of liquor distribution can include drill holes or other portage through crown pillars, or even from ore that has been broken to surface. A particular benefit given the improved liquor/ore sweep effectiveness at the higher irrigation rates (due to higher dispersion by the ore itself), is that large spray systems inserted on top of broken ore beneath the crown pillar can also be effective, with reduced distribution costs. An even further benefit is that reactions with pyrite that would parasitically consume large amounts of the limited ferric iron that is delivered for copper mineral leaching can be avoided, improving the productivity of the liquor for delivering copper.

7. Another arrangement is where the ore to be leached in step (b) is formed into the heap within a natural valley or a formed pit whereby the walls provide a natural barrier to convective air flow into the ore thereby allowing a degree of control at all points where that is desired.

8. Another arrangement is where the ore to be leached in step (b) is formed into a heap in which physical barriers which restrict air permeability are incorporated into the structure to allow control of air ingress into a part of or all of the heap. These barriers may be on the sides and or the top of the heap or distributed throughout the heap depending upon the geometric arrangement used and the topographic area in which the heap is constructed. A low cost means of covering the high heap surface area involves the use of compacted layers of specially prepared earth or ore. (In this case irrigation distribution systems such as drippers will be buried under the compacted layer). Where needed, a sealant may be used to improve the effectiveness of the compacted layer in breaking the air convection cells that might otherwise form. When it is desired to add additional layers of ore this compacted layer can easily be destroyed to permit liquor flow to the heap base by ripping with earthmoving equipment. Higher sloped areas such as heap flanks can be covered with thin plastic skirts or other suitable barriers to transfer of air at the end wall.

9. Another arrangement is where the heap to be leached in step (b) is constructed to exclude unwanted air through the sides and/or top and an aeration system is incorporated to allow controlled air injection into the heap and provide for some oxidation of ferrous ions present either directly or by microbiological activity, thereby increasing the effectiveness of the ferric delivered by some regeneration in-situ. In this case air rates are controlled so that the in-situ ferric generation rate never exceeds the capacity of the copper minerals in the ore to locally consume it by more than the desired degree for controlled pyrite reaction.

10. Another arrangement is where the flow of liquor into the heap to be leached in step (b) is sufficiently high that the heap is sufficiently saturated with liquor such that voids available to allow air flow by convection are limited.

11. Another arrangement is where the activity and nature of the bacteria (which includes bacteria naturally occurring in the heap and bacteria added to the heap) in an aerated leach section generating ferric iron is controlled through addition of chemical agents that inhibit their growth or selectively encourage particular bacteria so that ferric iron production rate is maintained sufficiently low that copper reactions are selective relative to pyrite reactions under the oxidising conditions of this aerated leach section.

12. The solution arising from the oxidising heap of step (a) may have predominantly ferric ions present, and may need adjustment by recycling some high ferrous ion solution which has been produced in step (b), possibly after copper removal in solvent extraction or by some other means.

13. In underground situations where the costs of pumping liquor to the surface for copper recovery at low liquor tenors are significant, there can be advantages in partially reoxidising some of the leach liquor and recycling it over broken ore, possibly in combination with freshly oxidised liquor from a surface heap to increase the amount of copper that can be extracted prior to copper recovery from a now higher tenor, lower volume solution that can be pumped to surface. Typically this is best done using a high intensity oxidation step such as reaction of the liquor directly with oxygen gas in a suitable reactor, possibly under pressure, or electrolytically in a suitable cell. This arrangement is especially advantageous where gangue contributes elements into solution that keep iron solubility low, or there is a desire to operate in a range of pH where iron solubility is limited, supplementing the ferric that may be delivered from an oxidised heap with regenerated ferric.

14. The ferric to ferrous ratio at the sulphide mineral surfaces to be leached in step (b) can also be controlled by limiting the rate of supply of liquor, and contained ferric ions, from step (a) such that the ferrous ions generated by reaction of the liquor with the copper sulphide minerals are sufficient to balance the ferric ions being provided in the leach liquor, and/or generated in situ by ferrous oxidation, and therefore capable of maintaining the ferric/ferrous ratio below that at which significant pyrite attack occurs. This can be achieved through balancing a combination of:

(a) the flow of fresh liquor,
(b) the total iron content,
(c) the initial ferric/ferrous ratio,
(d) the free acid available to support the reactions, and
(e) the oxygen available to enable ferrous oxidation, with the amount of available sulphide mineral to consume ferric, and its reactivity, which typically declines as reaction proceeds. In general, where ferric iron is delivered from an oxidising heap (e.g. a surface heap) in step (a) it is important that the full effect of the ferric iron that is delivered for leaching copper-containing minerals in step (b) is obtained, without significant breakthrough of ferric iron, so that copper tenors in leach liquor can be maintained. This can be achieved by setting heap depth, supplementing depleted layers of ore with additional layers or by reducing irrigation rates per unit area as ore becomes depleted. Which strategy is chosen depends on which of the above physical arrangements is selected for the desired overall effect of copper leaching with controlled pyrite leaching.

15. It has also been surprisingly found that in solutions having high ionic strength, particularly of sulphates, and particularly where the sulphate includes magnesium sulphate, and also where the solutions contain copper, higher ferric to ferrous ratios can be used while pyrite remains inert or close to inert than in low ionic strength, copper free systems. This enhanced ability to maintain selectivity at higher ferric to ferrous ratios provides the benefits of the proposed arrangement at lower pumping costs and for lower heap areas for a given irrigation rate per unit area, by intensifying copper delivery for a given amount of irrigation. In addition, it has been surprisingly found that across a range of relevant temperature and pH conditions, higher sulphate strengths in solution result in greater fixation of sulphate by driving reactions with less reactive potassium minerals to produce jarosite and alunite. The fixation of sulphate via this mechanism can enable an improved sulphate balance when the ore under leach is also high in reactive pyrite. Methods for increasing ionic strength include directing liquor of high ionic strength from other leach operations or locations to this heap, addition of ore types that generate sulphates in solution that do not fully hydrolyse under process conditions, operating to increase gangue and pyrite reactions temporarily to build up dissolved salts, limiting full neutralisation of bleed streams, limiting water ingress, and operating with airflows that optimise evaporation.

16. It has also been surprisingly found that for many ores the iron in solution can be maintained at very high levels, for example in excess of 10 gpL and possibly as high as 30 gpL (higher levels can create issues with solvent extraction and electrowinning stages of copper recovery) by controlling the total circuit pyrite oxidation so the iron entering solution slightly exceeds the availability of gangue elements that would precipitate iron prematurely. By diverting more ore, or more highly pyritic ore to the more oxidising heap this balance can easily be maintained in the above described arrangements.

17. It has also been surprisingly found that by diverting more highly pyritic material to the more oxidising (aerated) heap greater copper recovery can be achieved in this heap, without loss of recovery in the material to which ferric bearing solution from this heap is delivered. In this manner better overall recovery can be achieved. The higher pyrite content of the ore in the more oxidising heap protects chalcopyrite from passivation, by maintaining local conditions in the vicinity of the chalcopyrite near the ferric to ferrous ratio at which pyrite begins to react, which suits better leaching without passivation.

18. It has also been surprisingly found that by diverting "mixed sulphide" ore containing chalcocite and chalcopyrite together to the more oxidising (aerated) heap greater copper recovery can be achieved in this heap, without loss of recovery from the remaining chalcopyrite in the material to which ferric bearing solution from this heap is delivered. In this manner better overall recovery can be achieved. The higher chalcocite content of the ore in the more oxidising heap protects chalcopyrite from passivation, by maintaining local conditions in the vicinity of the chalcopyrite below the ferric to ferrous ratio at which chalcopyrite leaching rate is reduced by the onset of passivation.

19. It has also been surprisingly found that by diverting "mixed sulphide" ore containing other reactive sulphides (e.g. sphalerite/martite) and chalcopyrite together to the more oxidising (aerated) heap greater copper recovery can be achieved in this heap, without loss of recovery from the remaining chalcopyrite in the material to which ferric bearing solution from this heap is delivered. In this manner better overall recovery can be achieved. The higher reactive sulphide content of the ore in the more oxidising (aerated) heap protects chalcopyrite from passivation, by maintaining local conditions in the vicinity of the chalcopyrite below the ferric to ferrous ratio at which chalcopyrite leaching rate is reduced by the onset of passivation.

20. It has also been surprisingly found that by diverting ore containing chalcopyrite that is mineralogically in direct contact with pyrite (galvanically coupled) to the more oxidising (aerated) heap greater copper recovery can be achieved in this heap, without significant loss of recovery from the remaining chalcopyrite in the material to which ferric bearing solution from this heap is delivered. In this manner better overall recovery can be achieved. The higher galvanically coupled chalcopyrite in the more oxidising (aerated) heap protects other chalcopyrite from passivation, by reacting to maintain local conditions in the vicinity of the other chalcopyrite below the ferric to ferrous ratio at which chalcopyrite leaching rate is reduced by the onset of passivation.

21. One means of start up of processes involving a more oxidising surface heap for step (a) and a separate heap for step (b) that receives the ferric solution from step (a) is to operate the surface heap for a sufficient time, and on sufficient ore as to first generate the acid bearing, salts bearing and ferric bearing hot solution that is a suitable feed solution to the receiving heap, which is started when this solution becomes available.

22. Where the heap leach solution pH is maintained high (preferably above 1.6, and more preferably above 1.8) control of iron in solution can be natural at these pH conditions, or artificially induced to fall to even lower levels by introduction of ore types that deliver potassium or other Group I elements into solution, or by other means of addition of ammonia or Group I elements in order to encourage the formation of jarosite, reducing ferric iron solubility. It may also be achieved by blending neutralising ore types that may not be suitable as a sole heap leach feed due to high neutralising or sulphate fixing capacity into the heap, encouraging iron hydrolysis and precipitation. Alternatively, iron level and pH control can be supplemented by bleeding a solution into liquor that is held in successive lifts of ore and/or bleeding solution to a neutralisation step. This neutralisation can be by passing solution over barren or mineralised mined material that has a high ability to fix acid and sulphates (e.g. carbonate bearing material, such as may be found in waste rock that is mined). Alternatively it can be by use of lime or limestone (or limestone bearing ground rock) suspended in the solution in a reactor.

23. Another alternative for controlling the solution iron and pH levels is to use reverse osmosis membranes which selectively allow the passage of sulphuric acid to transfer acid from the leach solution into a higher acid solution thereby raising the pH of the leach solution, and if desired forcing iron precipitation, whilst providing a substantially clean, stronger acid, solution which can be used elsewhere in the leaching or if warranted can more readily be neutralised with gangue or limestone without unwanted losses of valuable copper and/or iron which may be needed as a leach agent.

In this arrangement it is important that when copper mineral uptake is advanced to the point to warrant addition of supplementary layers of ore to maintain production, further aeration of ore in the depleted layer is reduced or stopped, so that pyrite reaction is controlled to match acid and sulphate demand. In one means of achieving this degree of control an air distribution system is installed at a location within each layer of ore that is prepared for leaching. When a layer is depleted of metal values and the heap supplemented with a further layer (having its own aeration distribution system), the air to the lower layers is reduced or shut down so that copper recovery remains selective over pyrite reactions, even in these layers, through control of ferric to ferrous ratio of solutions passing from upper layers and coming into contact with copper sulphide minerals that continue to react in the lower layer. In this manner the total air supply can be managed to provide for a heat balance that ensures good temperature control (by evaporation) while pyrite reactions remain under control. According to this arrangement the pregnant copper bearing solution collected at the base of the heap will contain ferrous iron that will cycle through solvent extraction (for removal of copper) to the upper level aerated section. Convection of air from the air injection point at the base of the uppermost layer through lower layers that have reduced aeration or no aeration is reduced by this arrangement, since ferrous iron returning to the top of the heap provides a fast reaction with air that generates a higher temperature zone than would normally be encountered at the top of a heap relative to the rest of the heap, discouraging cold and hot spots that might set up convection cells that deliver air into the partially depleted lower layer where pyrite reaction is fast relative to copper recovery. Addition of plastic or other impermeable skirts or use of valley walls to discourage convection through heap flanks and other surfaces can also be applied, as described above.

24. In another means of achieving stoppage or significant reduction of pyrite reaction after high rate copper recovery has finished and the desired degree of pyrite reaction has been achieved (for example, by appropriate control of pH and iron level), the ore is removed from the irrigated and aerated heap, possibly after flushing, for storage in a waste pile or other repository (an "on-off" heap). In this manner pyrite uptake is limited both during copper recovery and following copper recovery, achieving the overall desired copper recovery and acid balance.

25. In any or all of the above arrangements it has been surprisingly discovered that reactions of acid consuming gangue minerals can be significantly reduced, so that both acid generation and acid consumption from pyrite bearing ores are reduced together. Without wishing to be limited, one mechanism involved is reduced evolution of acid within the ore particles where gangue is immediately available for reaction, due to controlled pyrite reactions. In this manner ores that would normally be considered unsuitable for heap leaching because of either too high acid production or too high acid consumption by gangue (or both) can be treated economically, since there is less need to bleed solutions for treatment for sulphate control.

26. The process may include any suitable step or combination of steps for recovering copper from the leach liquor(s) produced in the process.

In addition to the above-described process, according to the present invention there is also provided a system for leaching an ore containing sulphidic copper-containing minerals that includes:

(a) a first heap or a first layer of a heap of the ore, (b) a leach liquor supply and collection apparatus to facilitate carrying out an aerated oxidising leach of the ore in the first heap or the first layer and causing reactions with a source of iron such as pyrite in the ore and producing an acidic leach liquor that contains ferrous ions, ferric ions, and copper ions in solution, (c) a second heap or a second layer of a heap of the ore; and (d) a leach liquor supply and collection apparatus to facilitate carrying out a leach of the ore in the second heap or the second layer using the leach liquor from the first heap or the first layer, respectively under conditions that minimise reactions with a source of iron such as pyrite in the ore and producing a leach liquor containing copper ions in solution.

The present invention is described further with reference to the accompanying drawings, of which:

FIG. 1 is a flowchart of one embodiment of the process of this invention.

The process shown in the flowsheet includes an aerated oxidising heap leach of the type described above as step (a) of the process (i.e. the upper leach shown in the Figure) and a heap leach of the type described above as step (b) of the process (i.e. the lower leach shown in the Figure). The two heap leaches are carried out in physically separate heaps.

In the upper heap, raffinate from solvent extraction and make-up acid and water are used to irrigate the ore in the aerated heap and control pyrite reactions to produce a leach liquor having a ferric to ferrous ratio of less than 10.

More particularly, the flowsheet includes (i) a recycle step that recycles a part of the leach liquor from the step (b) leach back to that step, (ii) SX/EW steps to recover copper from leach liquors from steps (a) and (b), and (iii) a recycle step that supplies a raffinate from the SX step to the oxidising (aerated) heap step (a).

Optionally, solution from the aerated oxidising heap leach can also pass to SX for copper removal prior to use in further leaching, and any recycled solution can be passed through SX for copper removal prior to recycle.

Optionally, not all of the solution from the aerated heap would need to go to the step (b) leach—some or all may go to a common collection pond that also takes copper bearing solution from the step (b) leach, and splits and recycles this solution either before or after SX onto the oxidising aerated leach and onto the step (b) leach. In this case the solution in the common collection pond is maintained at a ferric to ferrous ratio that suits selectivity against pyrite reactions in the step (b) leach, by managing its proportional split for recycle to the two separate leach steps. This approach may have advantages when there are few opportunities for liquor segregation via multiple liquor catchments.

Figure 1:
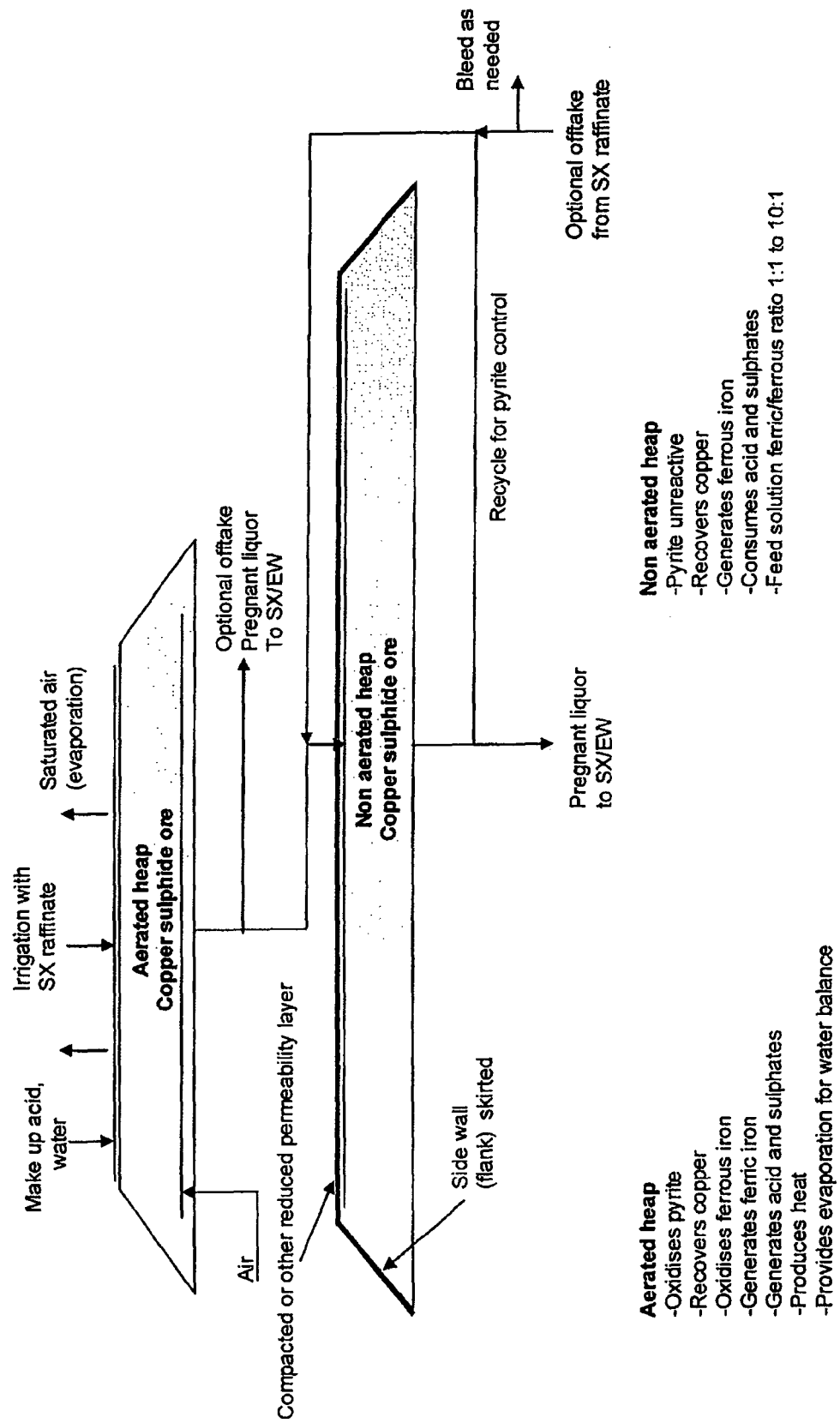
FIG. 1 is a diagram of one embodiment of a process for leaching a copper-containing sulphidic ore in accordance with the present invention.
Figure 2:
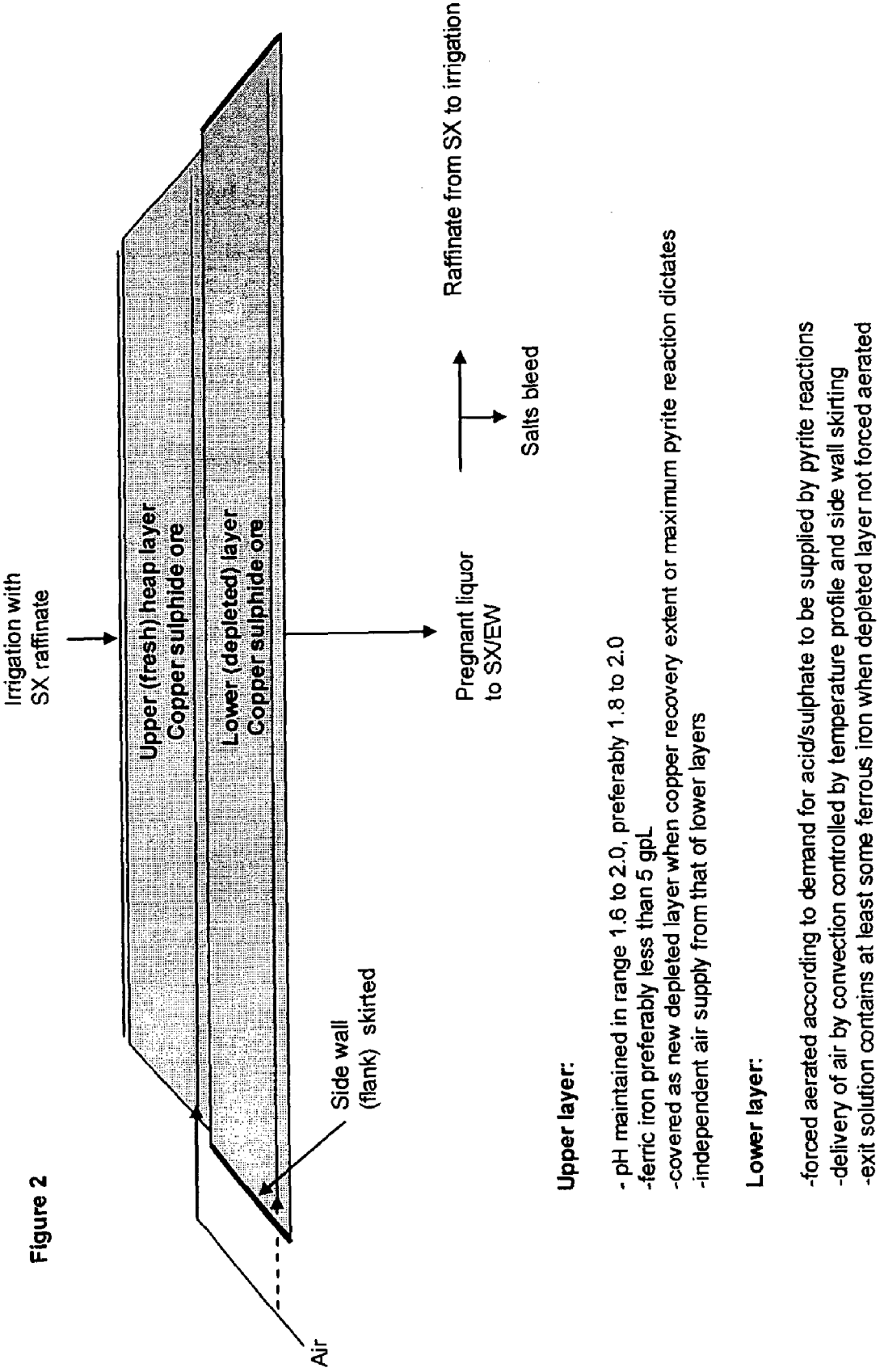
FIG. 2 is a diagram of another embodiment of a process for leaching a copper-containing sulphidic ore in accordance with the present invention.

FIG. 2 is a flowchart of another, although not the only other, embodiment of the process of this invention.

The process shown in the flowsheet includes two layers or "lifts" of ore in the same physical leach, with a fresh layer deposited on the top of a depleted layer. Each of the layers is equipped with an independent forced aeration distribution system that can be supplied with air by blowers.

In the fresh layer of ore the pH is maintained at 1.8 to 2.0 by reaction of gangue components in the ore with raffinate from solvent extraction that is used to irrigate the ore, and control of pyrite reactions, with overall acid supply being managed by the total system pyrite reaction extent, possibly supplemented by addition of purchased sulphuric acid. Control of pH, coupled with gangue reactions that consume iron (e.g. by production of the iron sulphate mineral jarosite) maintains an iron level in solution of from 3 to 10 gpL. Under these conditions of pH and iron concentration the ferric regeneration rate in the coupled ore/solution system particularly under bacterially assisted oxidation is relatively low, which assists selectivity of copper mineral reactions over pyrite reactions by maintaining ferric to ferrous ratio in the vicinity of sulphide particles at a sufficiently low level early in the leach cycle such that pyrite reactions are very slow or altogether eliminated. As copper depletion continues, pyrite reaction commences with increasing ferric to ferrous ratio in the irrigating solution. When copper depletion or pyrite reaction has reached a critical point (either for copper recovery or acid/sulphate balance) a new fresh layer is added, and the depleted layer continues to react with ferric iron and acid in the solution exiting from the top layer and passing through the depleted layer. Skirts of low permeability material may be added to the flanks of the depleted layer to reduce air ingress by natural convection. Depending on the extent of pyrite reaction that is desired for an acid/sulphate balance, air may be added to the depleted layer for a portion of the leach cycle time. When air is not added to this layer, residual copper minerals or pyrite react with the ferric iron delivered in solution from the upper layer, bringing the ferric to ferrous ratio down to a level at which further pyrite reactions are very slow or altogether eliminated in the absence of aeration. While some air is convected into the depleted layer from the air distribution level of the upper layer, the temperature profile created by overall reactions, including oxidation of ferrous iron present in irrigation liquor in the top layer, reduces downward air ingress so that pyrite reaction in the depleted layer (and all previously covered depleted layers) can be controlled for practical purposes by control of the extent of forced aeration in the depleted layer itself.

This particular embodiment is best applied to ores that when subjected to aerated heap leaching are able to sustain pH in the desired range by sequential gangue reactions that occur in this range as acid is generated by pyrite reactions, such as with biotite, phlogopite and amphibole, amongst others.

The present invention is described further in relation to the following Examples:

EXAMPLE 1

A composite of drill core samples from the La Granja resource in Cajamarca, Peru was prepared having the composition shown in Table A, and subjected to a column test to investigate its heap leaching performance under realistic conditions. The composite contained both secondary and primary copper mineralisation, and also contained substantial pyrite, as well as the potentially reactive silicate gangue minerals phlogopite and chlorite, less reactive minerals including muscovite and orthoclase, and essentially unreactive minerals, particularly quartz.

TABLE A

Composition of Composite Mineralised Sample in Example 1

| Element | weight % |
| --- | --- |
| Cu | 0.91 |
| Fe | 2.97 |
| S | 2.86 |
| Mg | 0.58 |
| Al | 8.16 |
| K | 4.08 |
| Si | 32.12 |
| Ca | 0.14 |
| As | 0.02 |
| Na | 0.07 |

40% of copper as primary mineralisation

The composite sample was crushed, and prepared to have the particle size distribution shown in Table B.

TABLE B

Particle size distribution of Composite Mineralised Sample in Example 1

| Screen Size, mm | cum % passing |
| --- | --- |
| 12.5 | 100.00 |
| 8 | 52.22 |
| 4 | 29.26 |
| 1 | 10.43 |
| 0.2 | 2.00 |

7.97 kg of this sample was loaded into a 1 m high, 100 mm internal diameter cylindrical column that was water jacketed to maintain a wall temperature of 50° C. The sample was supported on a perforated distributor plate through which air could be passed upwards at a controlled rate through the column of material, and through which solutions added to and passing through the column could pass under gravity flow to a collection point.

The column was equipped with an irrigation dripper system on the top surface of the material that could be moved from day to day from one radial location to another, to ensure overall irrigation effectiveness for all of the material during the duration of the test.

The sample was initially acidified by passing 16.6 litres of 4.7 gpL sulphuric acid through the column over several days, with zero forced aeration.

Copper recovery into solution during the acidification test was recorded.

At the conclusion of acidification, 7.1 litres of a prepared inoculum solution containing a mixture of moderate thermophilic ferrous oxidising bacteria and sulphur oxidising bacteria, with 3.82 gpL iron, 0.236 gpL copper and 2.4 gpL sulphuric acid, maintained at a temperature of 50° C., was pumped from a small heated sump to recirculate through the column of material, passing from the irrigation distributor at the top of the material through the distributor plate to the collection point, with drainage back to the sump.

Commencement of air addition to the column followed immediately. The air rate used was 30 litres per hour at ambient temperature, and the irrigation rate chosen was 78.5 mL per hour.

During the test of ore behaviour daily sulphuric acid additions were made if the pH of the circulating system fell below pH 1.5, with the aim of maintaining system pH within a narrow range.

Samples of circulating solution (liquor) were taken at intervals from the sump at the base of the column, and sent for chemical analysis so that the development of conditions in the test and copper recovery into solution from the ore, as well as that of other elements, could be followed.

Liquor losses due to evaporation and sampling were made up daily, with addition of deionised water.

The test progressed under controlled and monitored conditions for 142 days. The graphs of FIG. 4 demonstrate the progress of this test.

Figure 4:
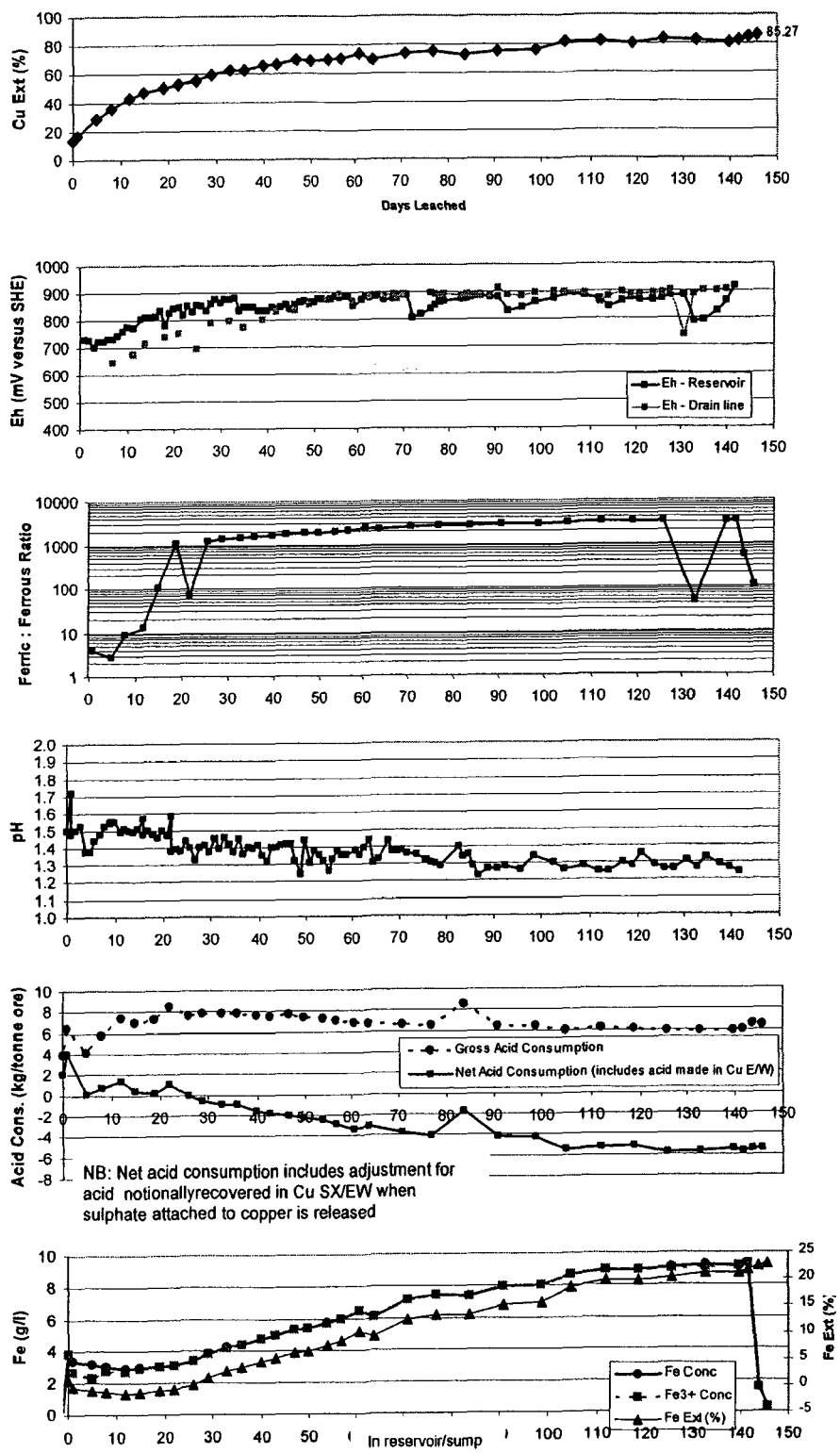
FIG. 4 is a series of graphs summarising the results of the tests in Example 1.

Following 142 days of testing under these conditions, the ore was flushed with 4 litres of 9.8 gpL sulphuric acid, and then with 4.02 litres of water. The drained solutions were analysed for contained elements, enabling an overall deportment to solution to be determined. Final copper recovery following flushing is also shown in the graphs of FIG. 4.

Subsequent instrumental mineralogical analysis of representative samples of the column test residue confirmed chalcocite extraction of 93%, and chalcopyrite extraction of 74%, demonstrating that in this test substantial recovery of copper from even primary mineralisation had occurred.

Further, both solution compositions and mineralogical analysis indicated substantial reaction of pyrite (53%) during the column test (pyrite was the dominating source of iron in the original composite sample).

Indeed, pyrite reactions were sufficient to result in a decline in pH during the test without further acid addition, consistent with net acid production from pyrite during the test. No acid additions were made after 33 days.

The results of this test illustrate that even where conditions in contact with primary copper sulphide mineralisation in heap leaching are locally maintained within ore particles by competing sulphide reactions at a level where copper recovery from chalcopyrite can be surprisingly high, these conditions may not result in practically achievable heap leaching and copper recovery circuits having acceptable economics.

In this test, as copper recovery was progressed, pyrite reactions that delivered large quantities of sulphate into solution were unavoidable under normally aerated conditions for heap leaching, and in practice demanding large quantities of neutralisation reagents to be used to maintain a solution sulphate balance.

EXAMPLE 2

A composite of drill core samples from the La Granja resource in Cajamarca, Peru was prepared having the composition shown in Table C, and subjected to a column test to investigate its heap leaching performance under realistic conditions. The composite contained predominantly primary copper mineralisation, and also contained substantial pyrite, as well as the potentially reactive silicate gangue minerals phlogopite and chlorite, less reactive minerals including muscovite and orthoclase, and essentially unreactive minerals, particularly quartz.

TABLE C

Composition of Composite Mineralised Sample in Example 2

| Element | weight % |
| --- | --- |
| Cu | 0.72 |
| Fe | 3.64 |
| S | 2.65 |
| Mg | 0.96 |
| Al | 8.11 |

TABLE C-continued

Composition of Composite
Mineralised Sample in Example 2

| Element | weight % |
|---|---|
| K | 3.06 |
| Si | 31.7 |
| Ca | 0.266 |
| As | <0.01 |

95% of copper as primary mineralisation

The composite sample was crushed, and prepared to have the particle size distribution shown in Table D.

TABLE D

Particle size distribution of
Composite Mineralised Sample in
Example 2

| Screen Size, mm | cum % passing |
|---|---|
| 12.5 | 100.00 |
| 8 | 49.34 |
| 4 | 27.51 |
| 1 | 9.73 |
| 0.2 | 2.00 |

9.37 kg of this composite was loaded into an identical column test arrangement to that described in Example 1, and a test was conducted according to the same parameters, and monitored and assessed in the same manner. In this case 17.45 litres of 4.8 gpL sulphuric acid was used for prior acidification, and 7 litres of inoculating solution having 4.86 gpL iron, 0.267 gpL copper and 2 gpL sulphuric acid was initially added to the sump for commencement of the test.

The test progressed under controlled and monitored conditions for 143 days. The graphs of FIG. 5 demonstrate the progress of this test.

Figure 5:
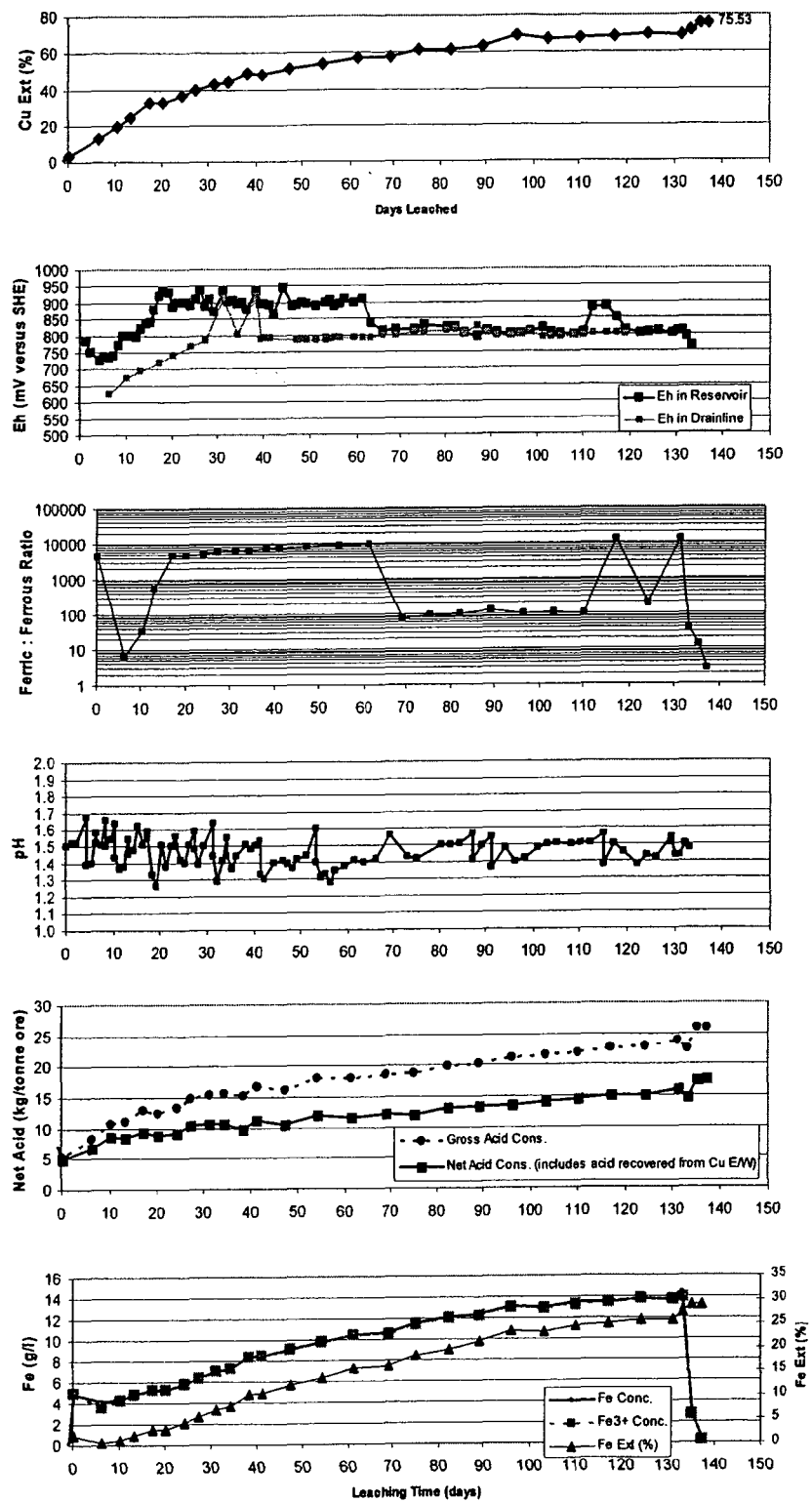
FIG. 5 is a series of graphs summarising the results of the tests in Example 2.

Following 143 days of testing under these conditions, the ore was flushed with 4 litres of 9.8 gpL sulphuric acid, and then with 4 litres of water. The drained solutions were analysed for contained elements, enabling an overall deportment to solution to be determined. Final copper recovery following flushing is also shown in the graphs of FIG. 5.

Subsequent instrumental mineralogical analysis of representative samples of the column test residue confirmed chalcopyrite extraction of 75%, confirming that in this test substantial recovery of copper from primary mineralisation had occurred.

Further, both solution compositions and mineralogical analysis indicated substantial reaction (38.5%) of pyrite during the column test (pyrite was also the dominating source of iron in the composite sample for this test).

Indeed, pyrite reactions were sufficient to maintain pH at 1.5 during the test with only small acid addition after an initial 10 kg of acid on the basis of one tonne of sample had been made, consistent with net acid production from pyrite during the test.

Similarly to the test described in Example 1, the results of this test illustrate that even where conditions in contact with primary copper sulphide mineralisation in heap leaching are locally maintained within ore particles by competing sulphide reactions at a level where copper recovery from chalcopyrite can be surprisingly high, these conditions may not result in practically achievable heap leaching and copper recovery circuits having acceptable economics.

In this test, as with the previous test, as copper recovery was progressed, pyrite reactions that delivered large quantities of sulphate into solution were unavoidable under normally aerated conditions for heap leaching, and in practice demanding large quantities of neutralisation reagents to be used to maintain a solution sulphate balance.

EXAMPLE 3

A test on an identical 9.4 kg sample of ore to that processed in Example 2 was conducted under similar conditions, but with one substantial difference.

In this case, air was not added through the distributor plate. Instead, aeration was conducted solely in the sump, where the rate of air sparging was controlled to maintain a ferric to ferrous ratio in solution fed to the column for the most part between 1 and 6, with occasional short excursions (each of no more than 1 day duration) as high as 11.

The test progressed under controlled and monitored conditions for 232 days. The starting liquor volume was 20 litres—in an enlarged sump for the purposes of this test (the sump liquor residence time was increased to enable sparged oxidation in this sump). The graphs of FIG. 6 demonstrate the progress of this test.

Figure 6:
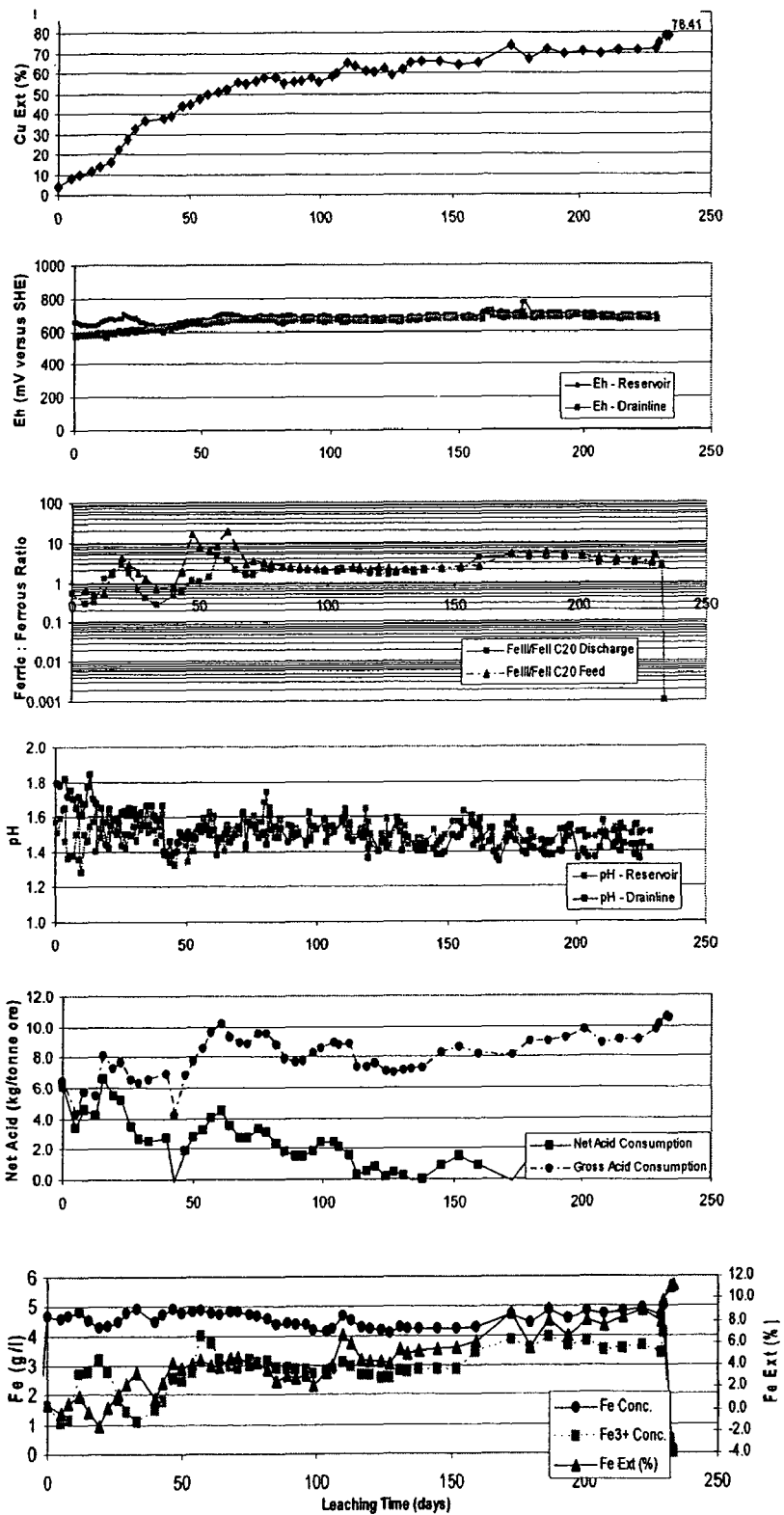
FIG. 6 is a series of graphs summarising the results of the tests in Example 3.

Following 232 days of testing under these conditions, the ore was flushed with 4 litres of 3.2 gpL sulphuric acid, and then with 4 litres of deionised water. The drained solutions were analysed for contained elements, enabling an overall deportment to solution to be determined. Final copper recovery following flushing is also shown in the graphs of FIG. 6.

Subsequent instrumental mineralogical analysis of representative samples of the column test residue confirmed chalcopyrite extraction of 75%, demonstrating that in this test substantial recovery of copper from primary mineralisation had occurred.

In the case of this test, however, both solution compositions (iron in solution) and mineralogical analysis indicated that there was inconsequential reaction of pyrite during the column test.

Further, despite the observation that pyrite reactions were inconsequential, there was less consumption of sulphuric acid to maintain pH at 1.5 during the test of this Example than with the test in which pyrite reaction was substantial in Example 2. Reduced reaction of pyrite also coincided with reduced acid consumption by gangue reactions.

Without wishing to be limited by theory, the applicant believes that the reduced gangue reactions are a result of less opening up of pathways for further gangue reactions with added acid when pyrite contained in the ore does not react to local produce acid and mineral acidity within the ore itself.

During this test the dominant source of iron entering solution was iron delivered by chalcopyrite oxidation to deliver copper (chalcopyrite has 0.88 iron units by weight per weight unit of copper). Indeed, iron entering solution was less than the amount associated with copper recovery from chalcopyrite, as a result of fixing of some iron that was reacted from chalcopyrite into solid residues as the sulphate and iron bearing mineral jarosite.

In this test, as copper recovery was progressed, pyrite reactions that would normally have delivered large quantities of sulphate into solution during directly aerated leaching were suppressed, overwhelming sulphate demanded by the ore, eliminating the need for large quantities of neutralisation reagents to be used to maintain a solution sulphate balance.

By combining the results of tests described in Example 2 and Example 3, it is possible to demonstrate the practical and economic merits of the present invention. When a portion of a quantity of mined copper sulphide, pyrite and acid consuming gangue bearing ore is subjected to aerated heap leach conditions it generates acid and ferric iron, along with sulphate in solution. The remaining portion can then be leached with solutions generated from heap leaching of the first portion under conditions that are not aerated, consuming ferric iron, acid and sulphate, with no loss of copper recovery, and reduced overall pyrite and other gangue mineral reactions, resulting in a net acid, iron and sulphate balance that is self sustaining and requires little if any reagents either for pH control or neutralisation for maintaining sulphate and iron levels in solution.

Parasitic reactions of ferric iron with pyrite in the non aerated portion (which would consume ferric iron that would otherwise be available to react with copper minerals) can be avoided by maintaining ferric to ferrous ratio within prescribed limits by recycling of solutions as described in this invention to ensure that pyrite exposure to conditions under which it would react, at its locations in ore particles, is reduced to acceptable levels or minimised to result in near zero reaction.

Example 2 also demonstrates that the ferric iron carrying capacity of practical solutions is sufficiently high to deliver the required ferric into the non aerated portion (synthesised in Example 3) without requiring single pass copper tenor increments to be low, or requiring high pumping rates of solutions between the two ore portions.

EXAMPLE 4

In this test a composite sample of skarn ore from the La Granja resource was leached in an aerated column test conducted similarly to that described in example 2.

The composite sample was of the composition shown in Table E, and contained predominantly primary copper mineralisation, and also contained substantial pyrite, as well as the potentially reactive silicate gangue minerals phlogopite and chlorite, the latter in larger proportion than in the samples tested in Examples 1 to 3 above, less reactive minerals including muscovite and orthoclase (in smaller proportion), and essentially unreactive minerals, particularly quartz.

TABLE E

| Composition of Composite Mineralised Sample in Example 4 | |
|---|---|
| Element | weight % |
| Cu | 0.96 |
| Fe | 10.2 |
| S | 10.05 |
| Mg | 1.04 |
| Al | 5.72 |
| K | 0.62 |
| Si | 27 |
| Ca | 0.28 |
| As | 0.012 |
| Na | 0.02 |
| Zn | 0.494 |

90% of copper as primary mineralisation

The composite sample was crushed, and prepared to have the particle size distribution shown in Table F.

TABLE F

| Particle size distribution of Composite Mineralised Sample in Example 4 | |
|---|---|
| Screen Size, mm | cum % passing |
| 12.5 | 100 |
| 8 | 73 |
| 4 | 45 |
| 1 | 20 |
| 0.2 | 2 |

3.59 kg of this composite sample was loaded into an identical column test arrangement to that described in the above Examples, and a test was conducted according to the same parameters as in Examples 1 and 2, and monitored and assessed in the same manner. In this case 9.94 litres of 4.8 gpL sulphuric acid was used for prior acidifcation, and 7 litres of inoculating solution having 0.869 gpL iron and 3.2 gpL sulphuric acid was initially added to the sump for commencement of the test.

The test progressed under controlled and monitored conditions for 431 days. The graphs of FIG. 7 demonstrate the progress of this test.

Figure 7:
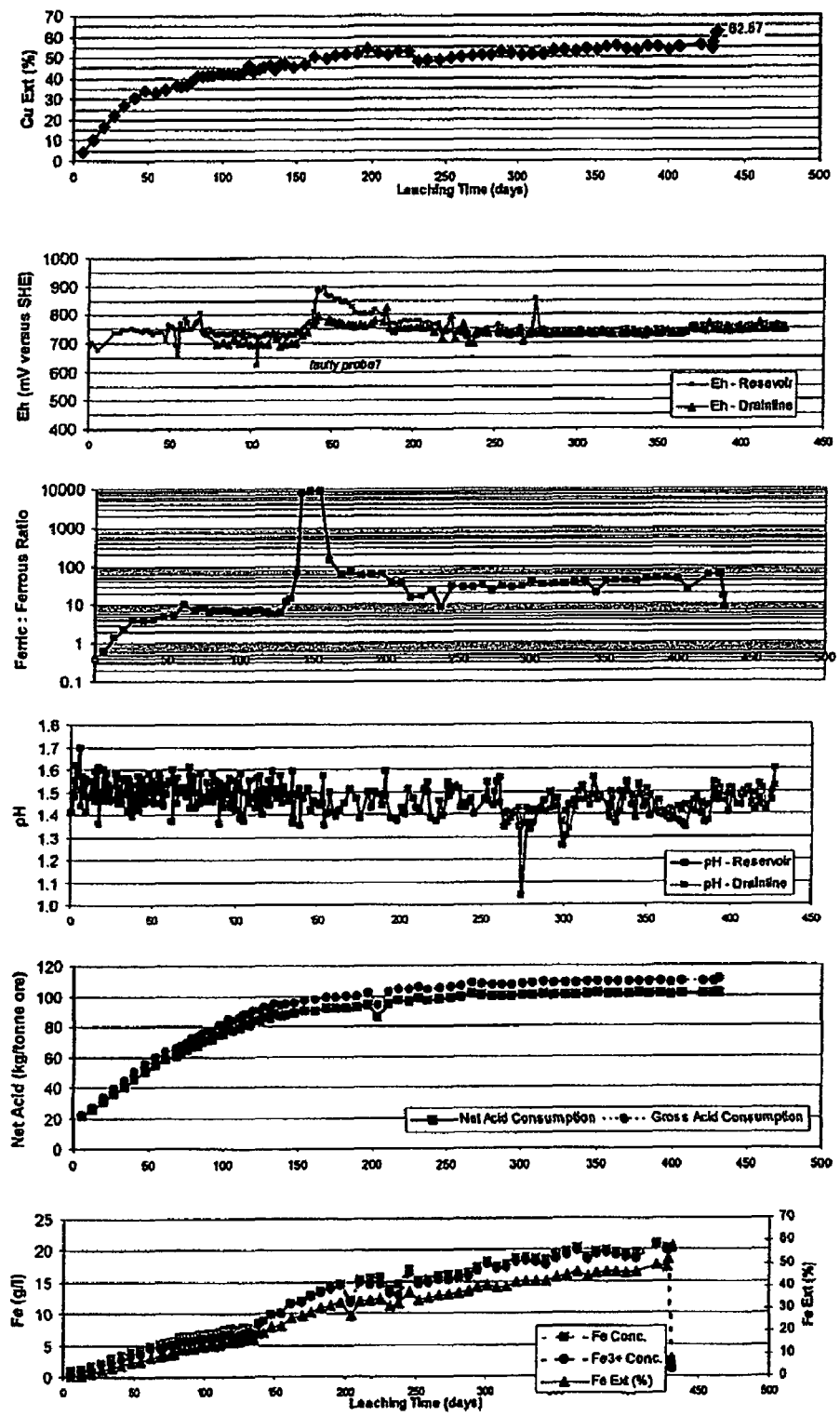
FIG. 7 is a series of graphs summarising the results of the tests in Example 4.

Following 431 days of testing under these conditions, the ore was flushed with 4 litres of 3.1 gpL sulphuric acid, and then with 4 litres of water. The drained solutions were analysed for contained elements, enabling an overall deportment to solution to be determined. Final copper recovery following flushing is also shown in the graphs of FIG. 7.

Subsequent instrumental mineralogical analysis of representative samples of the column test residue confirmed that in this test substantial recovery of copper from primary mineralisation had occurred.

Further, both solution compositions and mineralogical analysis indicated substantial reaction of pyrite (71%) during the column test (pyrite was also the dominating source of reacted iron in the composite sample for this test).

Indeed, pyrite reactions were sufficient to maintain pH at 1.5 during the latter part of the test with only small acid addition after an initial 100 kg of acid on the basis of one tonne of sample had been made, consistent with net acid production from pyrite during the test. The large increase in iron concentration in solution also attests to high pyrite reaction. At all times that copper was leached pyrite was also reacting.

Similarly to the tests described in Examples 1 and 2, the results of this test illustrate that even where conditions in contact with primary copper sulphide mineralisation in heap leaching are locally maintained within ore particles by competing sulphide reactions at a level where copper recovery from chalcopyrite can be surprisingly high, these conditions may not result in practically achievable heap leaching and copper recovery circuits having acceptable economics.

In this test, as copper recovery progressed to a high extent, pyrite reactions that delivered large quantities of sulphate into solution were unavoidable under normally aerated conditions for heap leaching, and in practice demanding large quantities of neutralisation reagents to be used to maintain a solution sulphate balance.

Further, the combination of pyrite reaction within the particles making up the reacting sample, which provided pathways to reactive acid consuming gangue, with the acid addition to maintain the selected pH in the early part of copper recovery, resulted in high acid consumptions for this material that would not be sustainable in operating practice due to very high acid costs per unit of copper recovered.

EXAMPLE 5

In this test a composite sample of skarn ore from the La Granja resource was leached in an aerated column test conducted similarly to that described in Example 4, but with a substantial difference in the leach solution conditions applied.

The freshly prepared composite sample was similar to but not identical to that tested in Example 4. Its composition is shown in Table G. The sample contained predominantly primary copper mineralisation, and also contained substantial pyrite, as well as the potentially reactive silicate gangue minerals phlogopite and chlorite, the latter in larger proportion than in the samples tested in Examples 1 to 3 above, less reactive minerals including muscovite and orthoclase (in smaller proportion), and essentially unreactive minerals, particularly quartz.

The composite sample also contained the zinc sulphide minerals sphalerite/martite.

TABLE G

Composition of Composite
Mineralised Sample in Example 5

| Element | weight % |
| --- | --- |
| Cu | 0.81 |
| Fe | 9.19 |
| S | 9.2 |
| Mg | 1.13 |
| Al | 6.56 |
| K | 0.78 |
| Si | 28 |
| Ca | 0.13 |
| As | <0.01 |
| Na | 0.02 |
| Zn | 0.34 |

90% of copper as primary mineralisation

The composite sample was crushed, and prepared to have the particle size distribution shown in Table H.

TABLE H

Particle size distribution of
Composite Mineralised Sample in Example 5

| Screen Size, mm | cum % passing |
| --- | --- |
| 12.5 | 100 |
| 8 | 73 |
| 4 | 45 |
| 1 | 20 |
| 0.2 | 2 |

5.26 kg of this composite was loaded into an identical column test arrangement to that described in the above Examples, and a test was conducted according to the same parameters as in Examples 1,2 and 4, with the exception of starting pH (which was set to 1.8) and monitored and assessed in the same manner, except again that pH was controlled to 1.8. In this case 4.2 litres of inoculating solution having 1.56 gpL iron, 0.263 gpL copper and 2.7 gpL sulphuric acid was initially added to the sump for commencement of the test.

Figure 8:
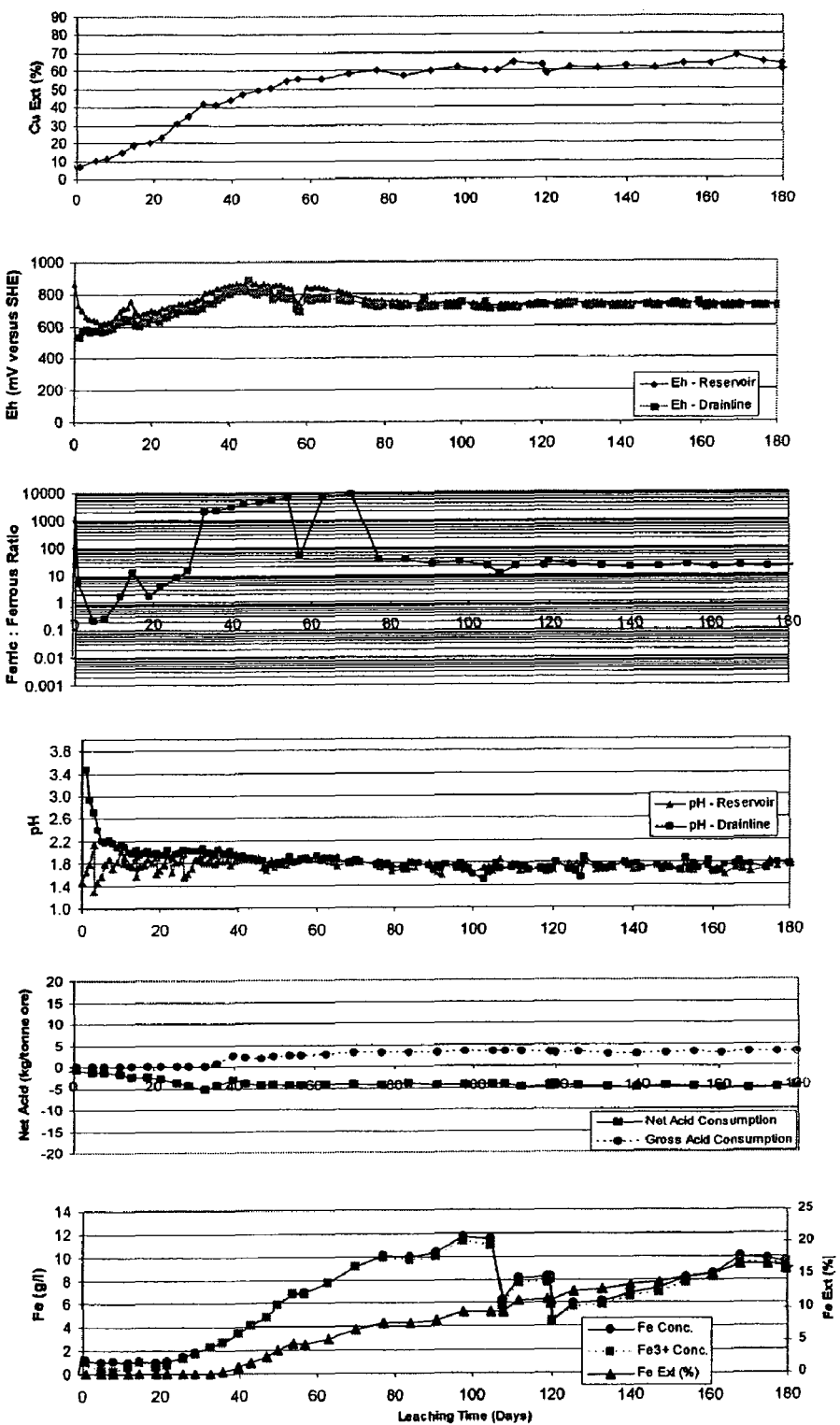
FIG. 8 is a series of graphs summarising the results of the tests in Example 5.

The test progressed under controlled and monitored conditions for initial copper recovery for 180 days. The graphs of FIG. 8 demonstrate the progress of this test.

Following 180 days of testing under these conditions, the ore was subjected to other tests that are not the subject of the present disclosure, so flushing was not conducted until later. Consequently copper recovery for this test can only be compared with the test in Example 4 on a pre-flushed basis.

At days 105 and 120 2 litres of sump solution was withdrawn for removal of ferric iron with lime treatment (maintaining other components) so that increasing iron in solution could continue to be used as a means of monitoring pyrite reaction during the test, from a lower base due to this treatment (at the pH 1.8 condition in the column ferric iron will undergo hydrolysis reactions that limit its solubility, and therefore its usefulness in monitoring pyrite unless its level is controlled).

In this test chalcopyrite recovery was faster than in the test of a similar material conducted at pH 1.5, and with higher eventual iron in solution as described in Example 4. Without wishing to be limited the applicants suggest that this is due to the onset of passivation in the case of Example 4, which was avoided in the test described in the present Example. The test conditions resulted in a lower ferric iron generation rate that maintained ferric to ferrous ratio locally, in part by reaction of ferric iron slowly with pyrite and sphalerite/martite to within the range in which chalcopyrite was not passivated. Zinc recovery to solution in this test followed copper recovery closely.

Further, as a measure of relative pyrite reaction, the iron extraction into solution for this test (a better relative measure of pyrite reaction than iron in solution given the different solution to ore ratios in these tests) was only 11.2% of the contained non chacopyrite borne iron in the feed. The corresponding iron extraction in the test of Example 4 was 45.5% of this basis. Mineralogical analysis of residues indicated an overall pyrite extraction for this test of 26% (compared with 71%, or virtually complete reaction of mineralogically available pyrite in the case of the test in Example 4). It is noted that not all iron from pyrite reaction enters solution, due to formation of jarosite in residues.

The reduced pyrite reaction (reducing pathways for further gangue reaction through reduced local gangue reactions with by product acid and mineral acidity) coupled with the lower pH for this test compared with the test of Example 4 also resulted in markedly lower acid consumption. Net consumption of added sulphuric acid to maintain pH was not sufficient to carry even the copper reacted from chalcopyrite into solution—acid supplied even for this purpose was delivered by the low pyrite reactions in this test.

This condition represents a virtuous cycle of reduced pyrite reaction for a given copper extraction, coupled with reduced gangue reactions, enabling higher copper extractions under aerated conditions before other limitations are experienced. In this manner, copper extractions can be brought to higher levels under fully aerated conditions that enables an acid/sulphate balance to be achieved for example by operating under different conditions in different layers of a heap leaching operation, independently managing copper recovery and pyrite and gangue reactions. In prior art processes copper recovery and other reactions are linked with no freedom for independent control and for many ore types resulting in the need to add acid or neutralising reagents.

A further observation in the results of this example is the dependence of pyrite reaction rate on iron level in solution, indicated by the accelerating rate of iron increase in solution as iron in solution increases in the first 50 days of the test, also observed in the results provided in Example 4 (at lower pH).

This effect has been eliminated by the time iron in solution reaches approximately 5 gpL, as is shown by non accelerating iron increases when iron in solution is reset to levels above this by solution treatment at 105 and 120 days.

That is, this example demonstrates the merits in aerated heap leach conditions of maintaining pH low to support faster pyrite reaction when operating at higher temperature (from exothermic pyrite oxidation) to assist with sulphide reactions and greater iron in solution is desired (with greater iron acting in an autocatalytic manner for producing even greater pyrite reaction and increased iron in solution) to enhance copper recovery, and also of maintaining pH high (above 1.8) or iron in solution below 5 gpL, and most preferably below 3 gpL, to obtain copper recovery without high pyrite reaction in cases where ore feeds to heap leaching contain large quantities of reactive pyrite and gangue.

In similarly conducted column tests the applicants have demonstrated that by maintaining pH above 2.0 ferric iron solubilities in solution can be maintained below 5 gpL, so by coupling gangue properties with pyrite reactions and acid additions in the case of many ores it is herein disclosed that it is possible to obtain the benefits of high pH and low iron in solution for reduced pyrite reactions for a given extent of copper reaction simultaneously.

Without wishing to be limited by theory, the benefits of higher pH (preferably above 1.6, more preferably above 1.8, most preferably above 2.0) and lower iron in solution for enhanced selectivity of copper reactions over pyrite reactions during aerated leaching are related to the maximum ferric regeneration rate that can be achieved in the coupled ore/solution/air oxidation under these conditions, which is lower than the corresponding maximum ferric regeneration rate at lower pH and higher levels of iron in solution. It is known that ferric and ferrous iron species are in more hydroxy complexed forms at high pH, and it is herein disclosed that under heap leach conditions these species are slower to diffuse and react with sulphides and dissolved oxygen than the less complexed forms encountered at lower pH. Further, oxidation of ferrous iron requires a source of acid that will not be readily available at higher pH in the coupled system. Also, we have found that, irrespective of pH, ferrous iron oxidation rates are highly dependent on the level of ferrous iron in solution in the coupled ore/solution/air oxidation system of heap leaching.

EXAMPLE 6

By data analysis of results of the column tests of Examples 1,2,4 and 5 above (aerated tests), as well as of 2 similarly operated tests on various materials from the La Granja resource under various conditions the ability to select conditions to facilitate the operation of the second aspect of the invention was demonstrated.

Figure 3:
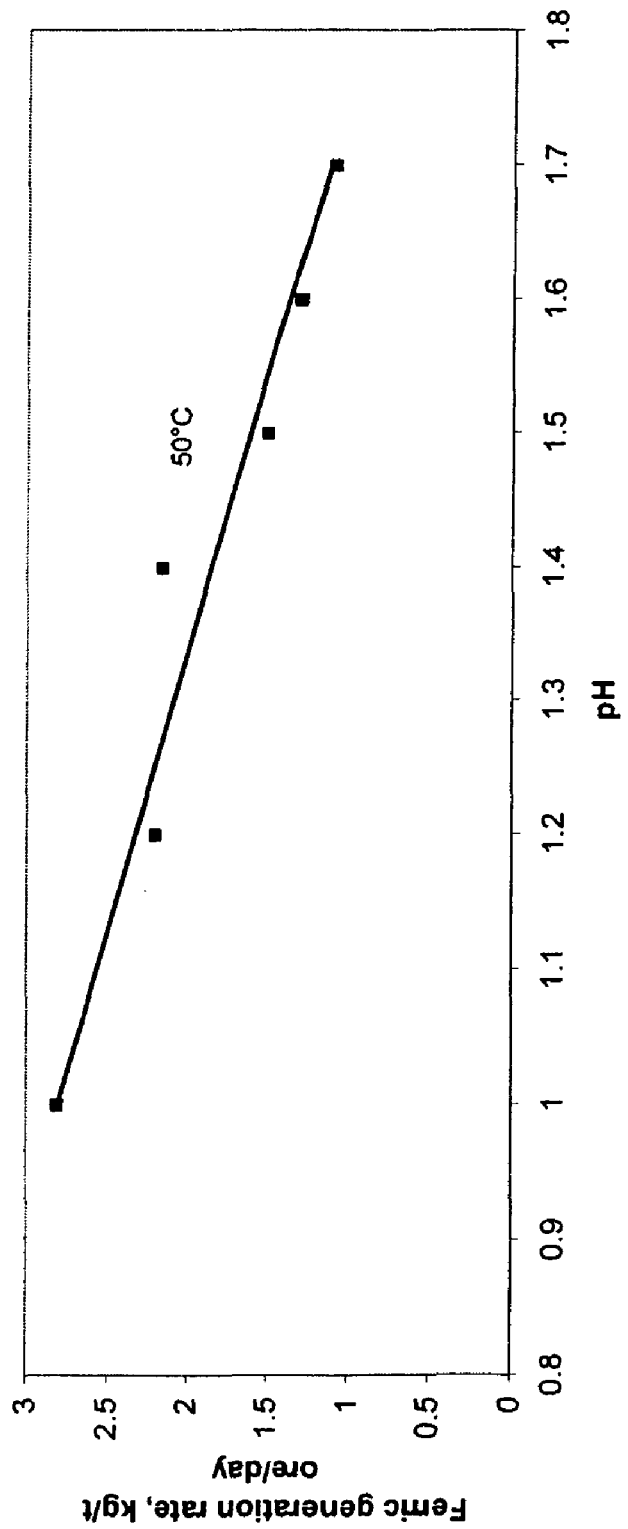
FIG. 3 is a graph of ferric ion generation rate versus pH.

FIG. 3 provides an emergent relationship between the ferric iron generation rate estimated from copper and iron extractions to solution in aerated column tests and the pH that is selected by matching acid inputs and generation rate with gangue reaction rates that has been established by the applicant. (Since the small amount of iron precipitation as jarosite for these tests is not included in calculations the ferric iron generation rate can be underestimated by this methodology, but relative conclusions are sound). By judicious selection at any particular temperature it is herein disclosed that it is possible to set the system ferric generation rate, which as also herein disclosed is a means of altering the selectivity of copper mineral reactions relative to pyrite and other sulphide mineral reactions while also assisting avoidance of passivation that may limit recovery of copper from primary copper mineralisation. This disclosure enables by way of example the control methods indicated in the embodiment of the present invention that is shown schematically in FIG. 2 for a wide range of ores having highly varied pyrite and acid consuming gangue components at low reagent consumptions and high copper recovery.

Many modifications may be made to the invention as described above without departing from the spirit and scope of the invention.

In particular, this invention is not limited to the above description.

By way of example, while the above description of this invention refers to copper-containing ores, with specific reference in many cases to pyritic ores that may also include reactive acid consuming gangue, the process of this invention is not limited to these ore types. The process of this invention has been found by the applicant to be equally applicable to control of pyrite and gangue reactions for other sulphide ores, with examples including but not limited to sulphidic zinc ores. In addition, this invention is not confined to ores that contain pyrite and extends to ores that have other sources of iron including but not limited to biotite, chalcopyrite, sphalerite, and pyrrhotite.

By way of further example, this invention can be applied alongside and in combination with many other conventional processes, such as any one or more of ore crushing and agglomeration, "on-off" heap leaching, prior ore acidification, intermediate liquor storage (ILS), final ore flushing, particular variants of solvent extraction and ion exchange, direct electrowinning, conventional heap leaching of selected ores (e.g. chalcocitic ores) in parallel, selection of particular ore types for diversion to milling and concentration circuits, and selection of particular ore types for diversion to milling, concentration and concentrates leach circuits, and to diversion of oxide ores to particular leach piles.

The invention claimed is
1. A process for leaching an ore containing sulfidic copper-containing minerals that includes the steps of:
   (a) carrying out an aerated oxidising leach of a part of the ore and producing an acidic leach liquor containing ferrous ions, ferric ions, and copper ions in solution;
   (b) carrying out a leach of another part of the ore using the leach liquor produced in step (a) under conditions that minimize reactions with a source of iron in the ore and producing a leach liquor containing copper ions in solution; and
   (c) recovering copper from the leach liquor.

2. The process defined in claim 1 includes selecting proportions and compositions of the parts of the ore in step (a) and step (b) so that a balance is achieved between sulfate consumption by gangue in the ore and sulfate generation by the ore, to result in very low reagent consumption relative to potential gangue acid consumption or relative to potential neutralisation requirements for sulfate produced by pyrite reactions.

3. The process defined in claim 1 or claim 2 wherein step (b) includes carrying out the leach of at least part of the ore for at least part of the time in a controlled leach environment in which the amount of ferric and ferrous ions present is controlled and flow rate and volume of the leach liquor supplied to the leach step (b) are managed such that there is a controlled ferric to ferrous ion ratio in the liquor which reacts with the sulfidic copper-containing minerals present in the ore.

4. The process defined in claim 3 includes controlling and integrating solution flows in step (a) and step (b) to control conditions so that the leach liquor in contact with at least part of the ore has a ferric to ferrous ion ratio of less than 10.

5. The process defined in claim 3 includes controlling and integrating solution flows in step (a) and step (b) to control conditions so that the leach liquor in contact with at least part of the ore has a ferric to ferrous ion ratio of less than 5.

6. The process defined in claim 3 includes controlling and integrating solution flows in step (a) and step (b) to control conditions so that the leach liquor in contact with at least part of the ore has a ferric to ferrous ion ratio in a range of 1.0 to 10.

7. The process defined in claim 3 includes controlling the ferric to ferrous ratio by recycling at least part of the solution flowing from the ore in step (b) back to step (b) separately or in admixture with solution flowing from the ore in step (a), with or without copper removal from any of these solutions before addition to ore.

8. The process defined in claim 1 wherein the part of the ore which is leached in step (a) is above the ground.

9. The process defined in claim 1 wherein the other part of the ore which is leached in step (b) is underground.

10. The process defined in claim 1 wherein the other part of the ore which is leached in step (b) is in a heap within a natural valley or a formed pit whereby walls of the valley or of the pit provide a natural barrier to convective air flow into the ore.

11. The process defined in claim 1 wherein the other part of the ore which is leached in step (b) is formed into a heap in which physical barriers which restrict air permeability are incorporated into a structure of the heap to allow control of air ingress into a part of or all of the heap.

12. The process defined in claim 11 wherein the heap of the other part of the ore which is leached in step (b) is constructed to exclude unwanted air through sides and/or top of the heap and includes an aeration system to allow controlled air injection into the heap and provide for some oxidation of ferrous ions to ferric ions present either directly or by microbiological activity.

13. The process defined in claim 1 or claim 2 includes controlling the rate at which ferric ions are formed in step (a) under aerated conditions by controlling iron concentration and pH of the leach liquor produced in step (a) for achieving enhanced selectivity of extraction of copper-containing minerals.

14. The process defined in claim 13 includes controlling the leach liquor pH to be above 1.6 for at least some of the time it is in contact with ore.

15. The process defined in claim 13 includes controlling the leach liquor pH to be above 1.8 for at least some of the time it is in contact with ore.

16. The process defined in claim 13 includes controlling the ferric iron in solution in the leach liquor to be less than 5 gpL.

17. The process defined in claim 13 includes controlling the ferric iron in solution in the leach liquor to be less than 4 gpL.

18. The process defined in claim 13 includes controlling the solution iron and pH for a given ore and solution ionic strength so that a balance is achieved between sulfate consumption by gangue and sulfate generation by pyrite to result in very low reagent consumption relative to potential gangue acid consumption or relative to potential neutralisation requirements for sulfate produced by pyrite reactions.

19. The process defined in claim 13 includes controlling the pH or ferric iron in solution by selecting or blending with ore types that deliver potassium or other Group I elements into solution or by other means of addition of ammonia or Group I elements in order to encourage the formation of jarosite thereby reducing ferric iron solubility.

20. The process defined in claim 13 includes controlling the pH or ferric iron in solution by bleeding a solution into liquor that is held in successive lifts of ore and/or bleeding solution to a neutralisation step.

21. The process defined in claim 13 includes controlling the pH or ferric iron in solution by using reverse osmosis membranes which selectively allow the passage of sulfuric acid to transfer acid from the leach solution into a higher acid solution thereby raising the pH of the leach solution whilst providing a substantially clean, stronger acid, solution.

22. The process defined in claim 13 wherein both parts of the ore which is leached are above-ground, with the one part being an upper layer of a heap and the other part being a lower layer of the heap.

23. The process defined in claim 1 wherein step (a) includes varying the leach conditions with time such that initially the chemical conditions are set to maximise copper extraction but as this becomes depleted they are changed, through increasing the ferric to ferrous ion ratio, to maximise the amount of ferric ion generated.

24. The process defined in claim 1 wherein both parts of the ore which is leached are above-ground, with the one part being an upper layer of a heap and the other part being a lower layer of the heap and partially depleted in copper, where for a part of the time iron reactions in the ore are encouraged in the lower layer, and for a part of the time iron reactions in the ore are minimized in the lower layer.

25. The process defined in claim 24 where iron reactions are controlled in the lower layer by inclusion of an air injection system in each layer of ore so that air can be introduced or not introduced directly to the lower layer while air is introduced or not introduced directly to the upper layer.

26. The process defined in claim 24 or claim 25 where exclusion of at least part of normal air ingress and flow driven by convection and oxygen consumption effects is controlled by use of heap construction techniques.

27. The process defined in claim 26 where the heap construction technique includes the use of relatively impermeable skirting on the flanks of the heap.

28. The process defined in claim 26 where the heap construction technique includes the construction of the heap in a valley so that heap flanks are naturally confined by valley walls to exclude natural convection.

29. The process defined in claim 1 includes supplying a low copper bearing liquor in the form of a raffinate from a solvent extraction step to step (a) so that at least some of the iron present in the combined liquor supply is in the ferrous state.

30. The process defined in claim 1 includes recovering copper from a part of the leach liquor from step (a).

31. The process defined in claim 1 includes controlling air rates so that the in-situ ferric generation rate does not exceed the capacity of the copper-containing minerals in the ore to locally consume it by more than the desired degree for controlled iron reaction.

32. The process defined in claim 1 includes controlling the flow of liquor into the heap to be leached in step (b) to be sufficiently high that the heap is sufficiently saturated with liquor such that voids available to allow air flow by convection are limited.

33. The process defined in claim 1 includes recycling a high ferrous ion solution produced in step (b) to leach step (a) to regenerate ferric iron from ferrous iron in leach step (a).

34. The process defined in claim 1 includes controlling the leach liquor, and therefore the ferric ions, from step (a) to step (b) such that the ferrous ions generated by reaction of the leach liquor with the copper sulfide minerals in the heap leached in step (b) are sufficient to balance the ferric ions being provided in the leach liquor and/or generated in situ by ferrous oxidation, and therefore capable of maintaining the ferric to ferrous ion ratio below that at which significant pyrite attack occurs.

35. The process defined in claim 34 includes controlling any one or more of the following parameters of the leach liquor produced in step (a):

(a) the flow of the leach liquor,
(b) the total iron content of the leach liquor,
(c) the initial ferric to ferrous ion ratio of the leach liquor,
(d) the free acid available to support the reactions, and
(e) oxygen available in the heap to enable ferrous oxidation.

* * * * *